(12) United States Patent
Hattori

(10) Patent No.: US 7,737,599 B2
(45) Date of Patent: Jun. 15, 2010

(54) SECURING STRUCTURE FOR STATOR AND ELECTRIC VEHICLE

(75) Inventor: Hiroyuki Hattori, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 5 days.

(21) Appl. No.: 12/087,994

(22) PCT Filed: Feb. 13, 2007

(86) PCT No.: PCT/JP2007/053118

§ 371 (c)(1),
(2), (4) Date: Jul. 18, 2008

(87) PCT Pub. No.: WO2007/099821

PCT Pub. Date: Sep. 7, 2007

(65) Prior Publication Data
US 2009/0021104 A1    Jan. 22, 2009

(30) Foreign Application Priority Data
Feb. 23, 2006    (JP)    .............. 2006-046934

(51) Int. Cl.
H02K 1/00    (2006.01)
(52) U.S. Cl. .................... 310/216.058; 310/89
(58) Field of Classification Search ............ 310/216, 310/217, 218, 89
See application file for complete search history.

(56) References Cited
U.S. PATENT DOCUMENTS
4,250,423 A * 2/1981 Linscott, Jr. .............. 310/258

6,582,207 B2 * 6/2003 Matsumoto et al. ...... 417/410.1
2002/0051715 A1    5/2002 Matsumoto et al.

FOREIGN PATENT DOCUMENTS

| JP | U-60-65389 | 5/1985 |
|---|---|---|
| JP | A-61-258635 | 11/1986 |
| JP | U-64-9435 | 1/1989 |
| JP | U-01-120750 | 8/1989 |
| JP | A-09-168253 | 6/1997 |
| JP | A-11-146619 | 5/1999 |
| JP | A-2000-166207 | 6/2000 |
| JP | A-2001-342954 | 12/2001 |
| JP | A-2003-176781 | 6/2003 |
| JP | 2003-244890 | * 8/2003 |
| JP | 2005-137057 | * 10/2003 |
| JP | A-2004-015957 | 1/2004 |
| JP | A-2005-229798 | 8/2005 |
| JP | A-2006-238558 | 9/2006 |

OTHER PUBLICATIONS

Toyota Technical Publications, Apr. 28, 2005, Issue No. 16748, Toyota Motor Corporation (w/ abstract).

* cited by examiner

Primary Examiner—Nguyen N Hanh
(74) Attorney, Agent, or Firm—Oliff & Berridge, PLC (57) ABSTRACT

A securing structure for a stator includes the stator having a stator core, and a housing having an opening portion containing the stator core, and the housing includes a portion A where the clearance between the inner circumferential surface of the opening portion and the stator core is relatively smaller and the inner diameter of the opening portion is constant, and a portion B located adjacent to the portion A in the axial direction of the stator core where the clearance between the inner circumferential surface of the opening portion and the stator core is relatively larger.

13 Claims, 10 Drawing Sheets

FIG.13

SECURING STRUCTURE FOR STATOR AND ELECTRIC VEHICLE

TECHNICAL FIELD

The present invention relates to a securing structure for a stator and an electric vehicle, and particularly to a securing structure for a stator that suppresses vibration and noise caused when a rotating electric machine is driven, as well as an electric vehicle including the securing structure.

BACKGROUND ART

A rotating electric machine including a stator has conventionally been known.

For example, Japanese Patent Laying-Open No. 2004-15957 discloses an electric motor (rotating electric machine) in which a stator having a stator core is press-fit in a housing (case).

Further, Japanese Patent Laying-Open No. 2000-166207 discloses a brushless fan motor having a rubber vibration isolator provided at a portion of contact between a case containing a stator and another casing.

Furthermore, Japanese Patent Laying-Open No. 9-168253 discloses a bearing structure for a motor with the intention of suppressing vibration and mechanical noise.

Moreover, a paper of issue number 16748 in Toyota Technical Publications published on Apr. 28, 2005 discloses a technique regarding a securing structure for an IPM (Interior Permanent Magnet) motor, for reducing vibration and noise by allowing a stator core and a high stiffness portion of a motor case to selectively abut on each other.

In the case where a stator is fit in a case so that the position where the stator is attached is determined, vibration of the stator caused when a rotating electric machine is driven is likely to be transmitted to the case.

Here, if the tolerance in fitting the stator is increased, the amount of eccentricity between the stator and the rotor is likely to be increased. As a result, imbalance in the electromagnetic attraction force occurs and accordingly vibration and noise increase. Further, if the amount of eccentricity between the stator and the rotor is particularly large, there is the concern that interference between the stator and the rotor might occur.

In contrast, if the tolerance in fitting the stator is decreased, the working efficiency in inserting the stator into the case is deteriorated. Further, the area of contact between the case and the stator increases, and accordingly vibration of the stator without being damped is likely to be transmitted to the case.

DISCLOSURE OF THE INVENTION

An object of the present invention is to provide a securing structure for a stator that suppresses vibration and noise as well as an electric vehicle including the securing structure.

A securing structure for a stator according to the present invention includes the stator having a stator core, and a housing having an opening portion containing the stator core. The housing includes a first portion where a clearance between an inner circumferential surface of the opening portion and the stator core is relatively smaller and an inner diameter of the opening portion is constant, and a second portion where the clearance between the inner circumferential surface of the opening portion and the stator core is relatively larger, the second portion being located adjacent to the first portion in an axial direction of the stator core.

In the above-described structure, the clearance between the inner circumferential surface of the opening portion and the stator core is smaller in the first portion of the housing, so that precise positioning of the stator core is facilitated. Further, the clearance is larger in the second portion of the housing, so that contact between the inner circumferential surface of the opening portion and the stator core is suppressed and the area of contact between the housing and the stator core is reduced. Thus, transmission of vibration of the stator core to the housing can be suppressed. Consequently, vibration and noise caused when the rotating electric machine is driven are suppressed.

In a first aspect, in the securing structure for the stator, respective clearances in the first portion and the second portion, between the inner circumferential surface of the opening portion and the stator core are made different from each other by varying the inner diameter of the opening portion of the housing along the axial direction of the stator core.

In another aspect, in the securing structure for the stator, respective clearances in the first portion and the second portion, between the inner circumferential surface of the opening portion and the stator core are made different from each other by varying an outer diameter of the stator core along the axial direction of the stator core.

In the securing structure for the stator, preferably the second portion has a depth of at most a half of a whole depth of the opening portion.

The depth of the second portion where the inner diameter of the opening portion is relatively larger is restricted, and accordingly inclination of the stator core can be reduced.

In the securing structure for the stator, preferably the clearance between the inner circumferential surface of the opening portion and the stator core in the second portion is determined such that the second portion of the housing and the stator core are apart from each other even in a case where an angle of inclination of the stator core is a maximum angle.

The securing structure for the stator further includes a fastening member inserted into the stator core in the axial direction of the stator core, and having one end secured to the housing to fasten the stator core to the housing. The first portion is located on a side where the fastening member is secured to the housing relative to the second portion.

Thus, contact between the stator core and the housing in a portion where vibration of the stator core is large can be suppressed. Consequently, vibration and noise caused when the rotating electric machine is driven can be suppressed more effectively.

An electric vehicle of the present invention includes the securing structure for the stator as described above. Thus, the electric vehicle having a significantly quiet interior can be obtained.

According to the present invention, vibration and noise caused when the rotating electric machine is driven can be suppressed, as described above.

BEST MODES FOR CARRYING OUT THE INVENTION

In the following, embodiments of a securing structure for a stator and an electric vehicle based on the present invention will be described. Here, like or corresponding components are denoted by like reference characters and a description thereof may not be repeated in some cases.

Figure 1:
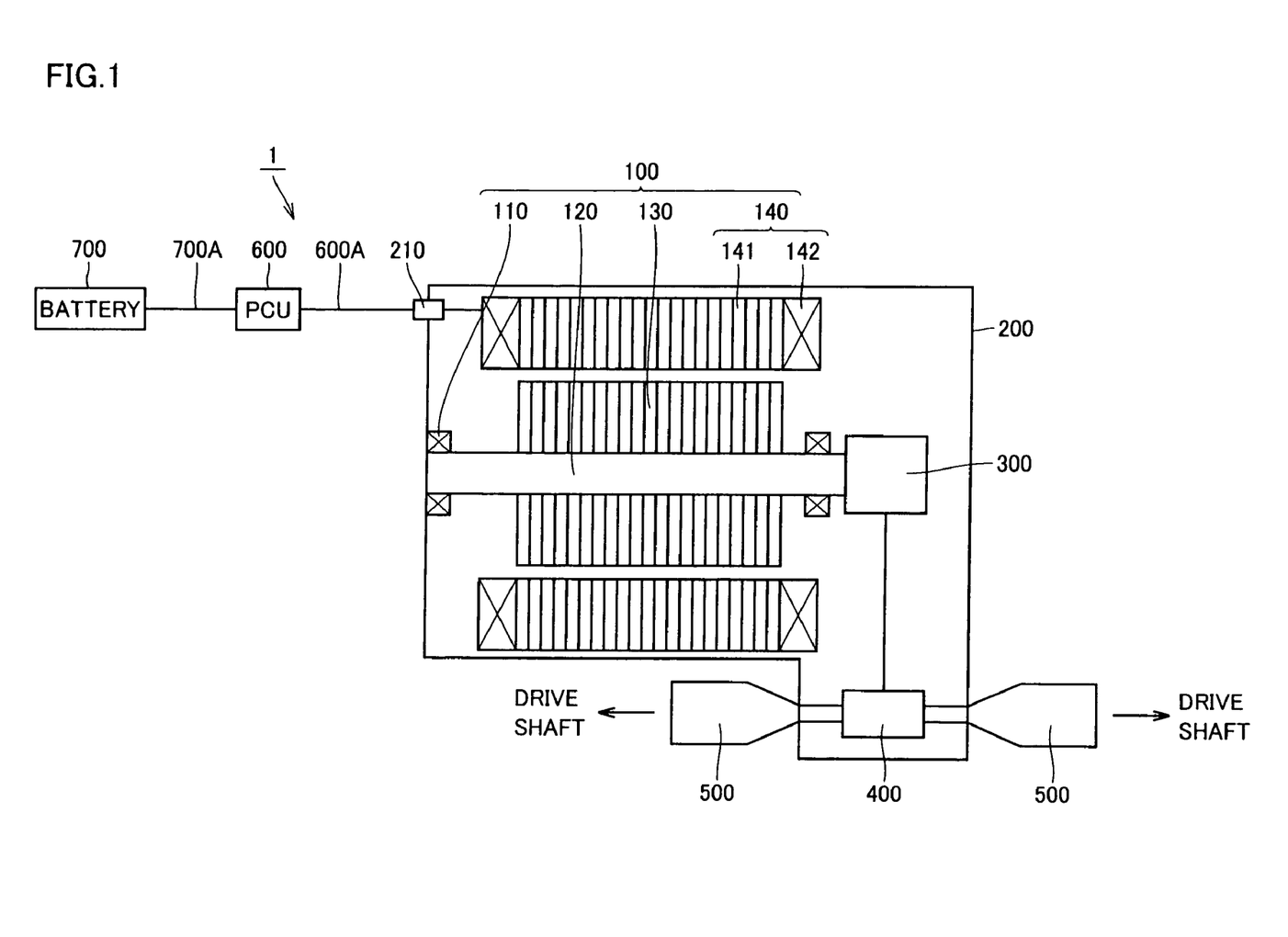
FIG. 1 is a diagram schematically showing a configuration of a drive unit to which a securing structure for a stator according to an embodiment of the present invention is applied.

FIG. 1 is a diagram schematically showing a configuration of a drive unit to which a securing structure for a stator according to an embodiment of the present invention is applied. In the example shown in FIG. 1, drive unit 1 refers to a drive unit mounted on a hybrid vehicle that is "electric vehicle", and is configured to include a motor generator 100, a housing 200, a reduction mechanism 300, a differential mechanism 400, and a drive shaft receiving portion 500.

Motor generator 100 is a rotating electric machine having the function of an electric motor or electric generator, and includes a rotational shaft 120 rotatably attached to housing 200 via a bearing 110, a rotor 130 attached to rotational shaft 120, and a stator 140. Stator 140 includes a stator core 141, and a coil 142 is wound around stator core 141. Coil 142 is electrically connected to a feed cable 600A via a terminal block 210 provided to housing 200. Feed cable 600A has another end connected to a PCU 600. PCU 600 is electrically connected to a battery 700 via a feed cable 700A. Accordingly, battery 700 and coil 142 are electrically connected.

The motive energy that is output from motor generator 100 is transmitted from reduction mechanism 300 through differential mechanism 400 to drive shaft receiving portion 500. The drive force transmitted to drive shaft receiving portion 500 is transmitted in the form of a rotational force through a driveshaft (not shown) to wheels (not shown) to cause the vehicle to run.

In contrast, when the hybrid vehicle is regeneratively braked, the wheels are rotated by an inertial force of the vehicle body. The rotational force from the wheels drives motor generator 100 via drive shaft receiving portion 500, differential mechanism 400 and reduction mechanism 300. At this time, motor generator 100 operates as an electric generator. The electric power generated by motor generator 100 is stored in battery 700 through an inverter in PCU 600.

Feed cables 600A, 700A are each a three-phase cable formed of a U phase cable, a V phase cable and a W phase cable. Coil 142 is formed of a U phase coil, a V phase coil and a W phase coil, and respective terminals of these three coils are connected to feed cables 600A, 700A that are each the three-phase cable.

The use of motor generator 100 is not limited to a hybrid vehicle (HV) and may be mounted on other "electric vehicles" (such as fuel cell vehicle and electric vehicle for example).

The hybrid vehicle has, for example, a mode of stopping the engine while traveling (such as an EV travel mode in which the vehicle is caused to travel by an electric motor supplied with electric power from a power storage mechanism while the vehicle speed is low, and a regenerative mode in which the kinetic energy of the vehicle is converted into electrical energy to be stored in a power storage mechanism while the vehicle is decelerated). In this mode, the background noise is low and thus gear noise and motor noise are relatively more likely to be heard. Therefore, it is important to suppress the noise while the motor generator 100 is driven. Further, in some cases, motor generator 100 to be mounted on a vehicle is under restrictions on adoption of noise control measures for a transmission system and a resonance system, because of limitations of space and weight. It is thus important to suppress noise caused when motor generator 100 is driven, while satisfying the limited conditions.

Figure 2:
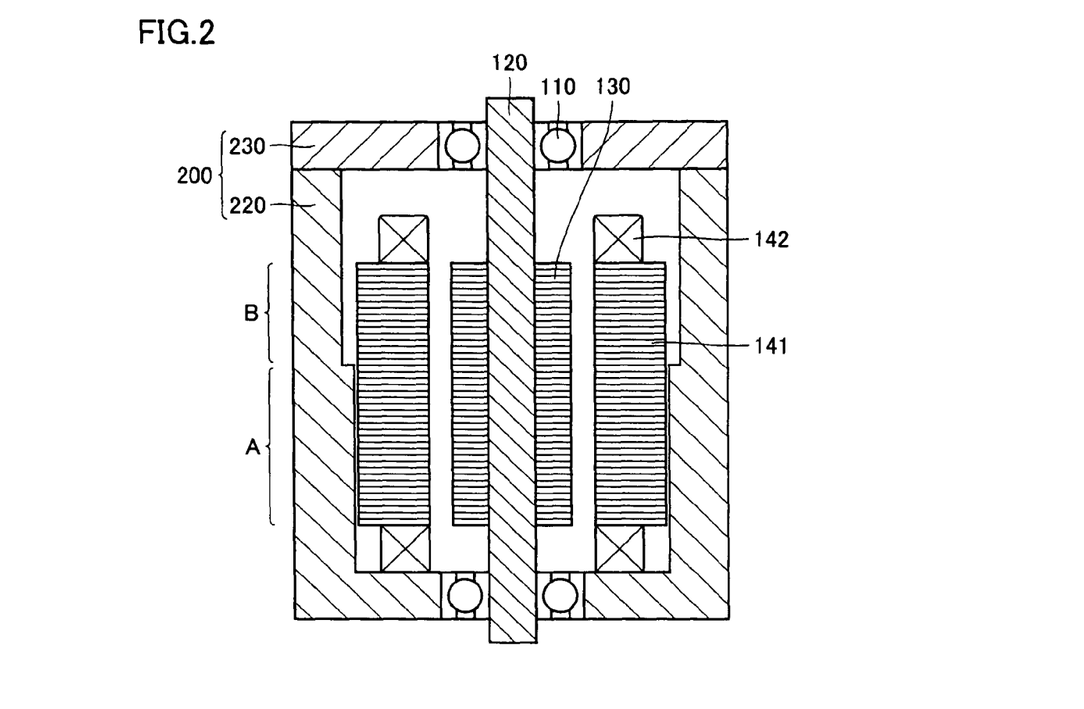
FIG. 2 is a cross section of a rotating electric machine including a securing structure for a stator according to an embodiment of the present invention.

FIG. 2 is a cross section of motor generator 100 including a securing structure for a stator according to an embodiment of the present invention. In FIG. 2, although only the stator-containing portion and its vicinity in housing 200 are shown for convenience of illustration, housing 200 may include any component other than the stator-containing portion.

Referring to FIG. 2, the stator-containing portion of housing 200 includes a case 220 and a cover 230. Stator core 141 is formed by stacking sheets of a magnetic material such as iron or iron alloy on each other. Stator core 141 is housed in case 220. In the example in FIG. 2, the outer diameter of stator core 141 is substantially constant in the axial direction over the whole outer periphery. In contrast, the inner circumferential surface of case 220 has a stepped portion. Therefore, a portion where the clearance between the outer circumferential surface of stator core 141 and the inner circumferential surface of case 220 is relatively smaller (portion A) and a portion where this clearance is relatively larger (portion B) are formed.

Figure 10:
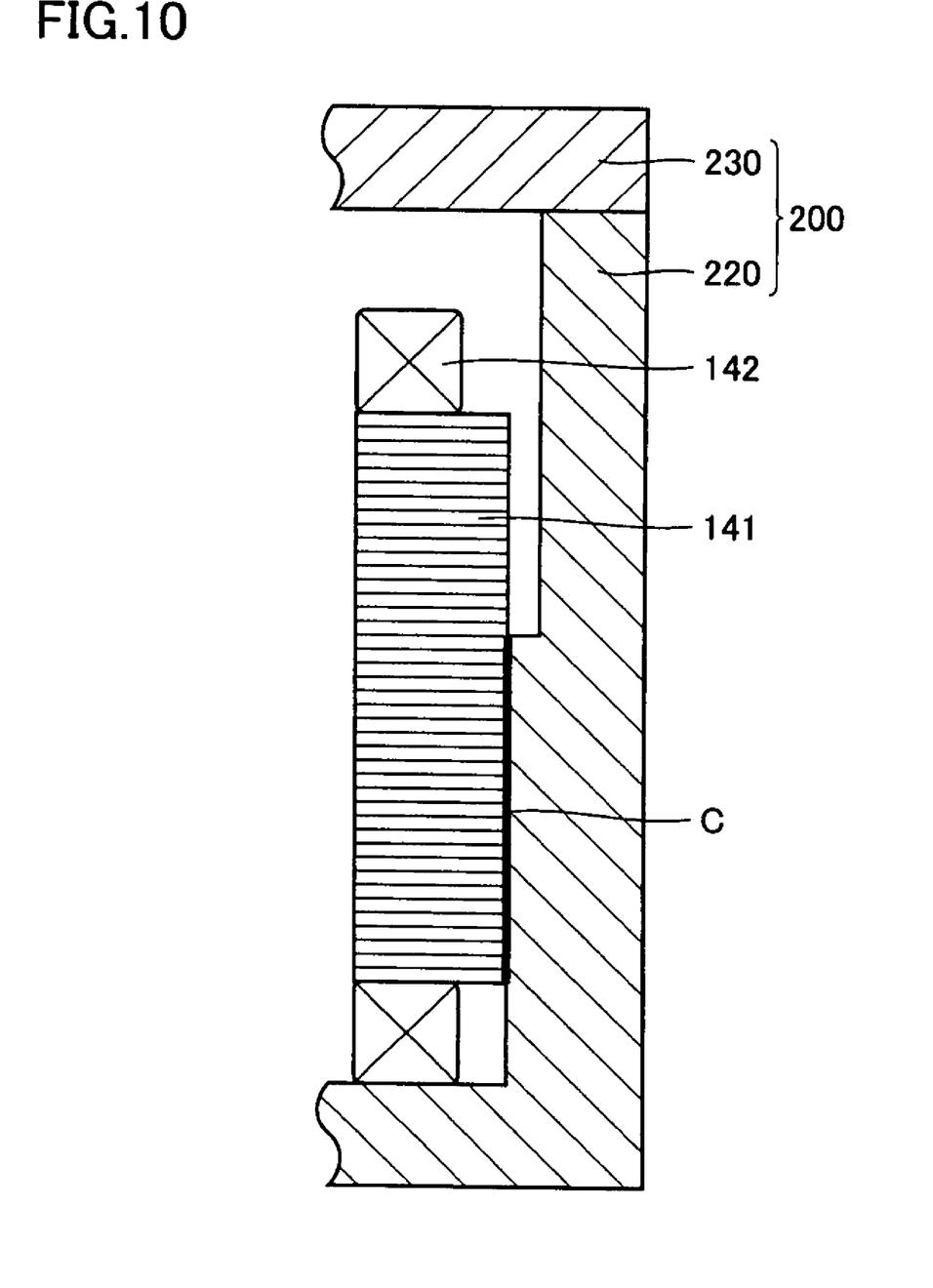
FIG. 10 is a (first) diagram illustrating a portion of contact between a stator core and a housing in a securing structure for a stator according to an embodiment of the present invention.
Figure 11:
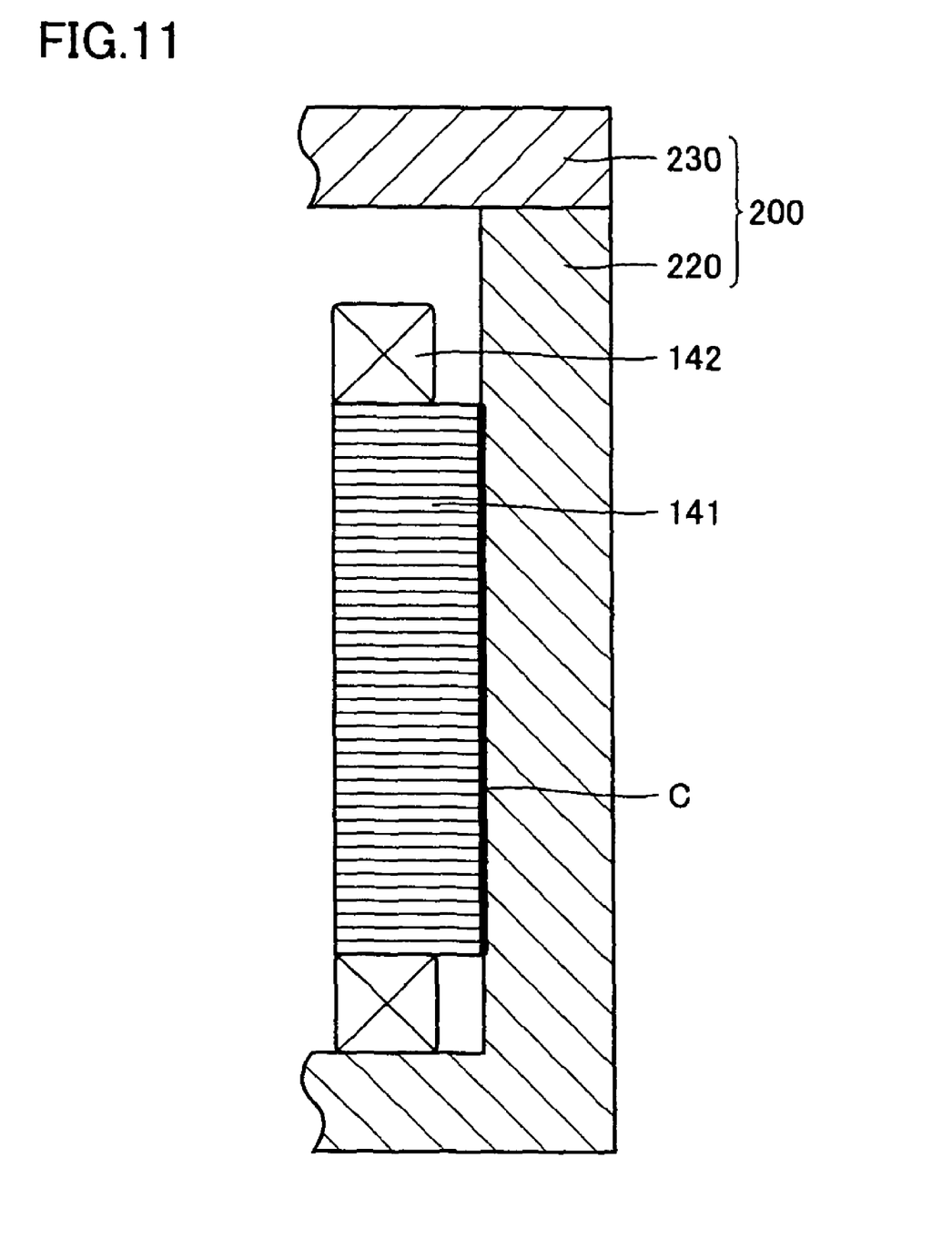
FIG. 11 is a diagram illustrating a portion of contact between a stator core and a housing in a securing structure for a stator according to a first comparative example.
Figure 12:
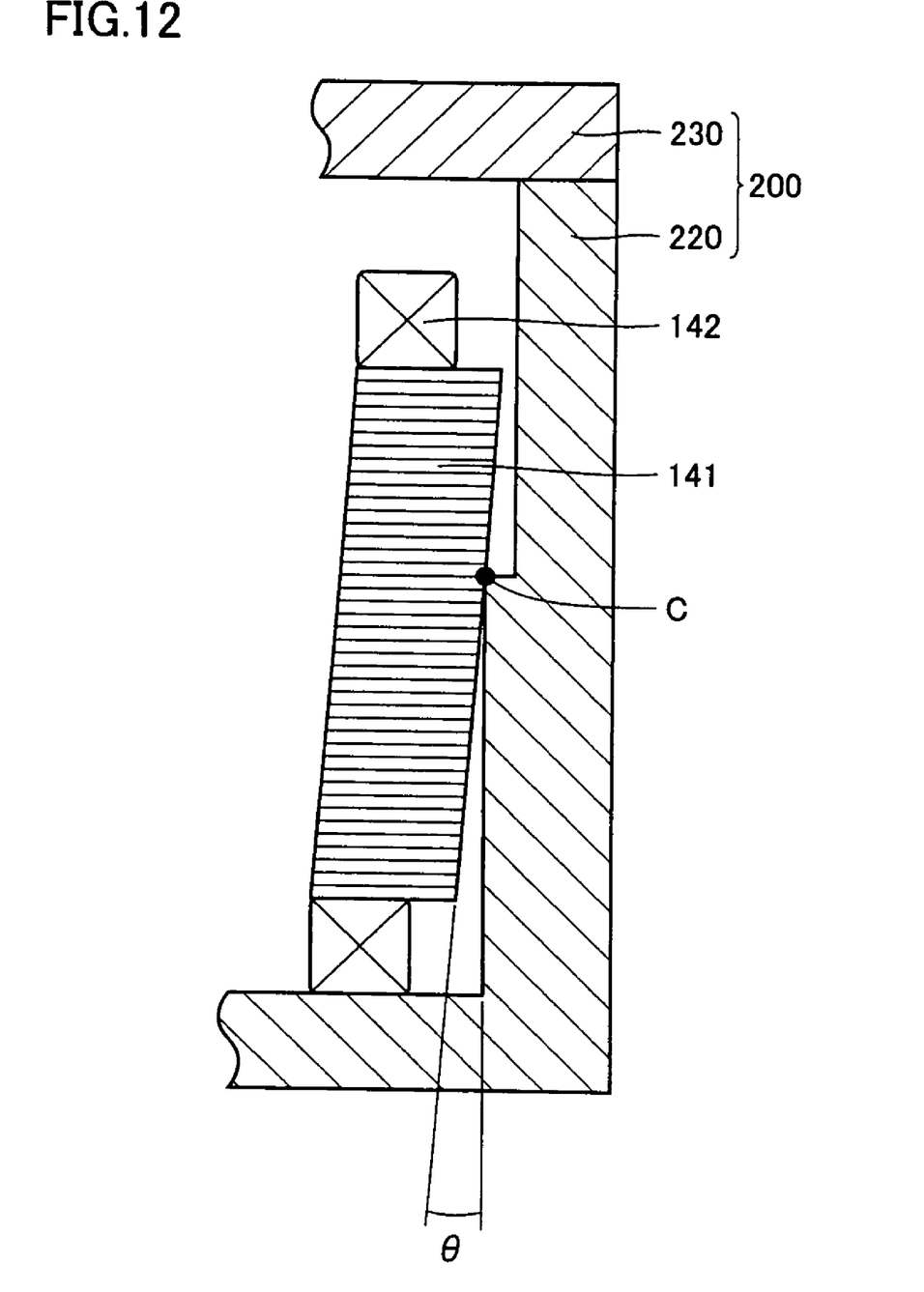
FIG. 12 is a (second) diagram illustrating a portion of contact between a stator core and a housing in a securing structure for a stator according to an embodiment of the present invention.
Figure 13:
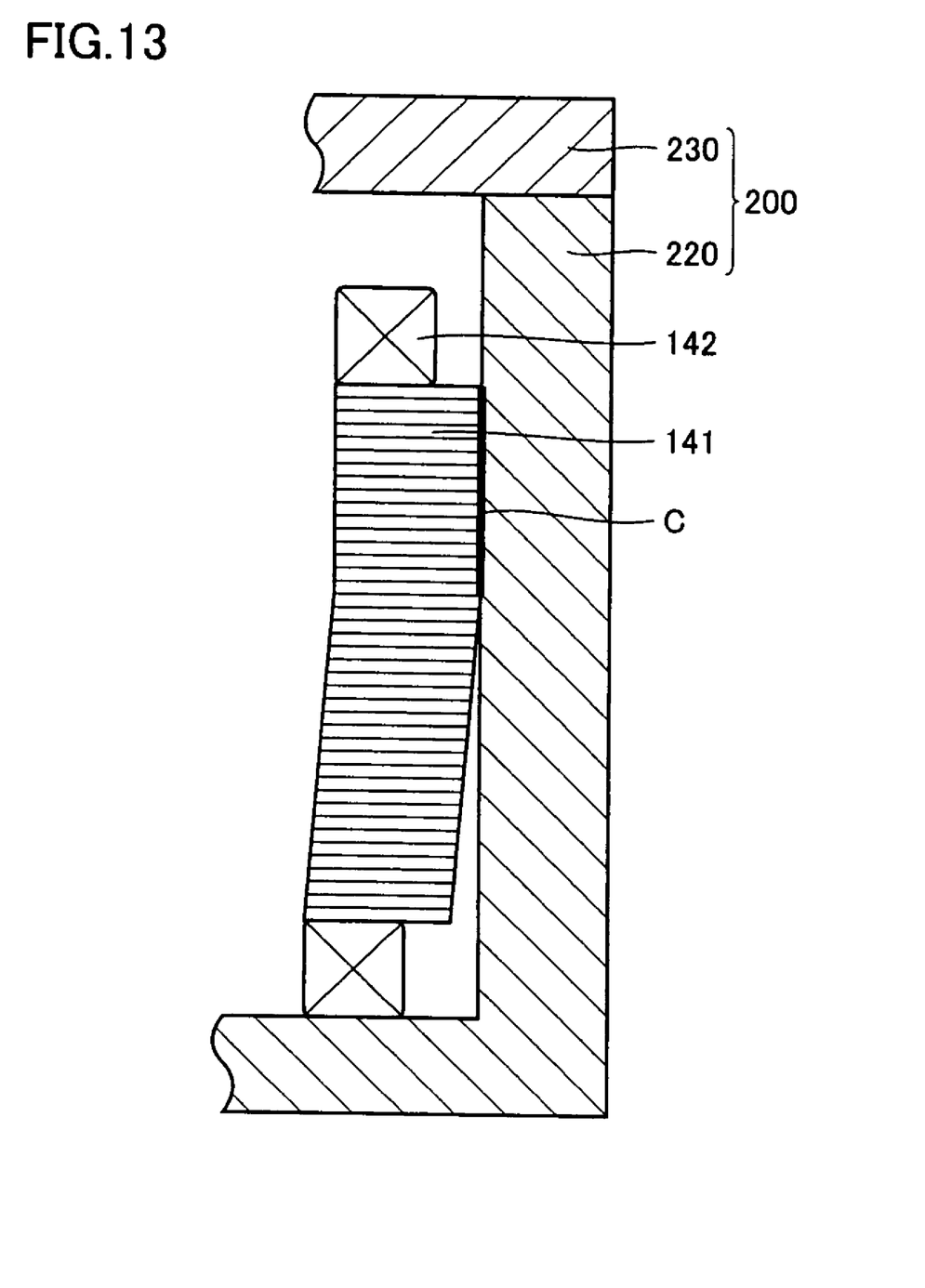
FIG. 13 is a diagram illustrating a portion of contact between a stator core and a housing in securing structure for a stator according to a second comparative example.

FIGS. 10 to 13 are diagrams illustrating effects provided by the securing structure for the stator shown in FIG. 2. Here, FIGS. 10 and 12 are each a diagram illustrating a portion of contact between stator core 141 and case 220, and FIGS. 11 and 13 are diagrams illustrating a portion of contact between stator core 141 and case 220 in respective structures according to first and second comparative examples.

Referring to FIG. 10, in the securing structure of the present embodiment, even if the axial core of stator core 141 and the axial core of case 220 are slightly displaced from each other, stator core 141 and case 220 contact each other over a part in the axial direction of stator core 141. Namely, a contact portion C between stator core 141 and case 220 extends over only a part in the axial direction of stator core 141.

In contrast, in the securing structure according to the first comparative example, if the axial core of stator core 141 and the axial core of case 220 are slightly displaced from each other similarly to the example in FIG. 10, stator core 141 and case 220 contact each other over the whole in the axial direction of stator core 141 as shown in FIG. 11. Namely, contact portion C between stator core 141 and case 200 extends over the whole in the axial direction of stator core 141.

Referring to FIG. 12, in the securing structure of the present embodiment, if stator core 141 is inclined until an angle of inclination (θ) becomes a maximum angle, stator core 141 and case 220 contact each other at one point in the axial direction of stator core 141. In other words, the inner diameter of the larger-diameter portion of case 220 is defined such that the core and case 220 do not contact each other even in the case where the angle of inclination (θ) of stator core 141 becomes a maximum angle. Therefore, contact portion C between stator core 141 and case 220 is limited to one point in the axial direction of stator core 141.

In contrast, in the securing structure according to the second comparative example, if stator core 141 is inclined similarly to the example in FIG. 12, stator core 141 and case 220 contact each other over a certain region in the axial direction of stator core 141 as shown in FIG. 13. Namely, contact portion C between stator core 141 and case 220 extends over a certain region in the axial direction of stator core 141.

As seen from the above, in the securing structure for the stator in the present embodiment, the area of contact between stator core 141 and case 220 is made smaller than that in the securing structures for the stator in the first and second comparative examples. Thus, vibration of stator core 141 is less likely to be transmitted to case 220. Further, the inner diameter of case 220 located in portion A (see FIG. 2) where the clearance between the outer circumferential surface of stator core 141 and the inner circumferential surface of case 220 is relatively small is made constant, so that positioning of stator core 141 when stator core 141 is inserted into case 220 is facilitated. As a result, displacement of respective axial cores of rotor 130 and stator 140 from each other is suppressed.

The transmission of vibration of stator core 141 to case 220 as well as the displacement of respective axial cores of rotor 130 and stator 140 from each other are thus suppressed, so that noise caused when motor generator 100 is driven is suppressed.

It is preferable that the depth of the larger diameter portion of case 220 is approximately a half or less of the depth of the whole of the opening portion of housing 200. The depth of the larger diameter portion of case 220 is thus limited, so that inclination of stator core 141 can be reduced and contact between the core and case 220 can be suppressed.

Figure 3:
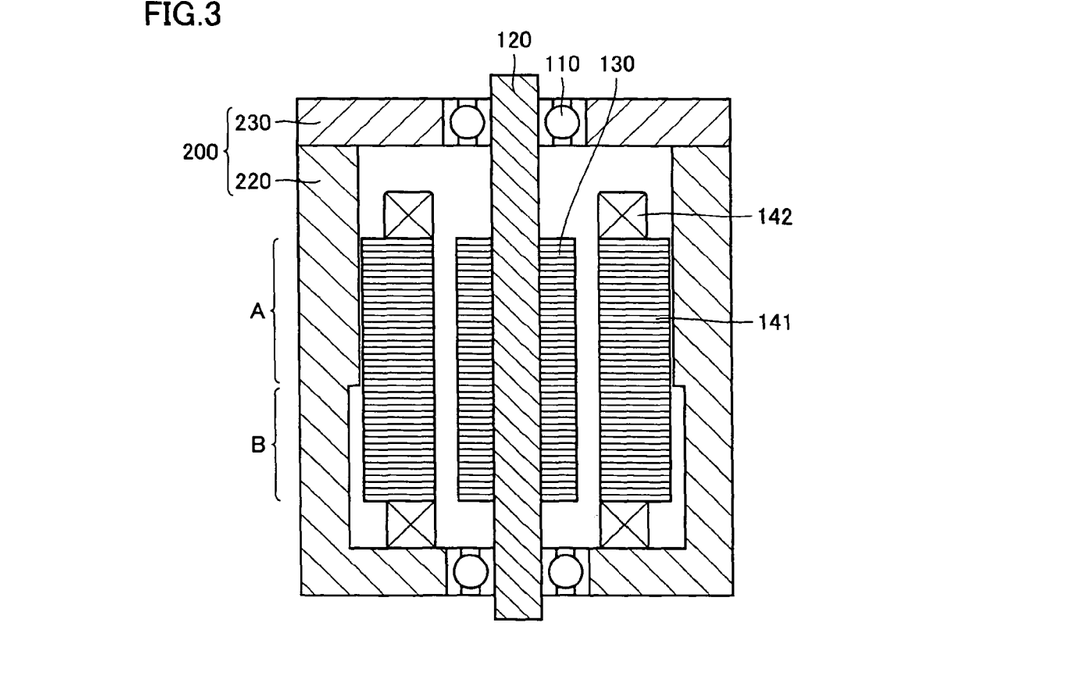
FIG. 3 is a cross section of a rotating electric machine including a modification of the securing structure for the stator according to an embodiment of the present invention.
Figure 4:
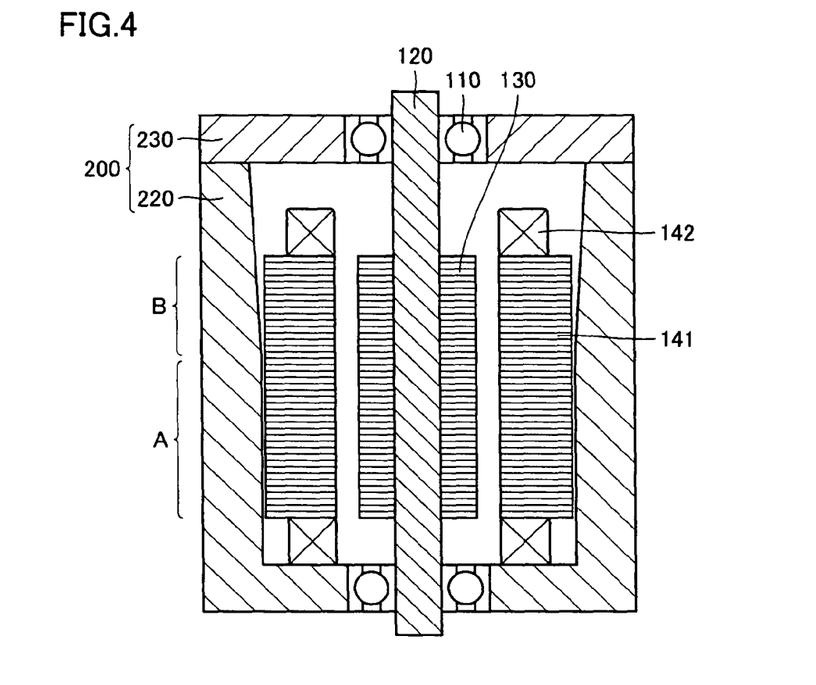
FIG. 4 is a cross section of a rotating electric machine including another modification of the securing structure for the stator according to an embodiment of the present invention.
Figure 5:
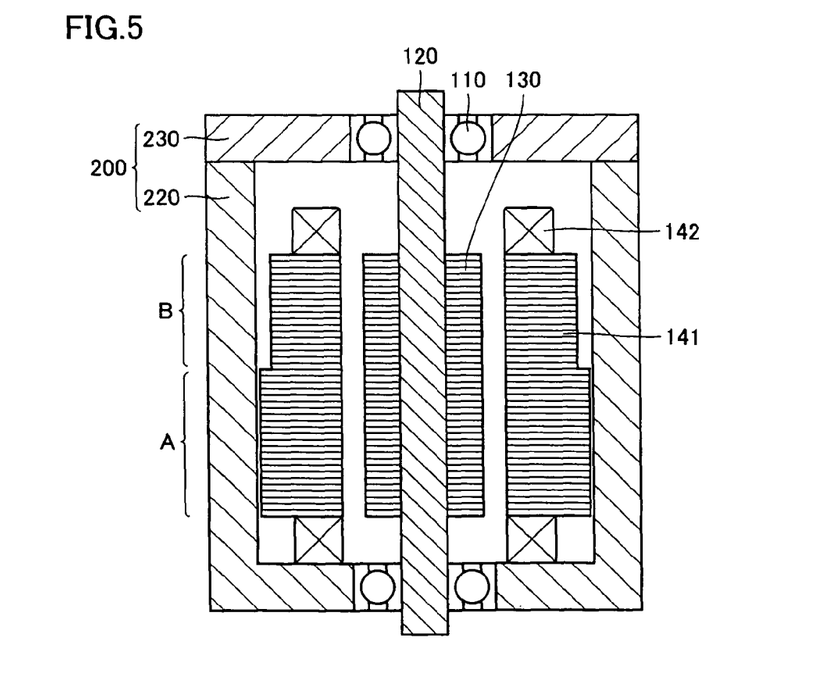
FIG. 5 is a cross section of a rotating electric machine including still another modification of the securing structure for the stator according to an embodiment of the present invention.
Figure 6:
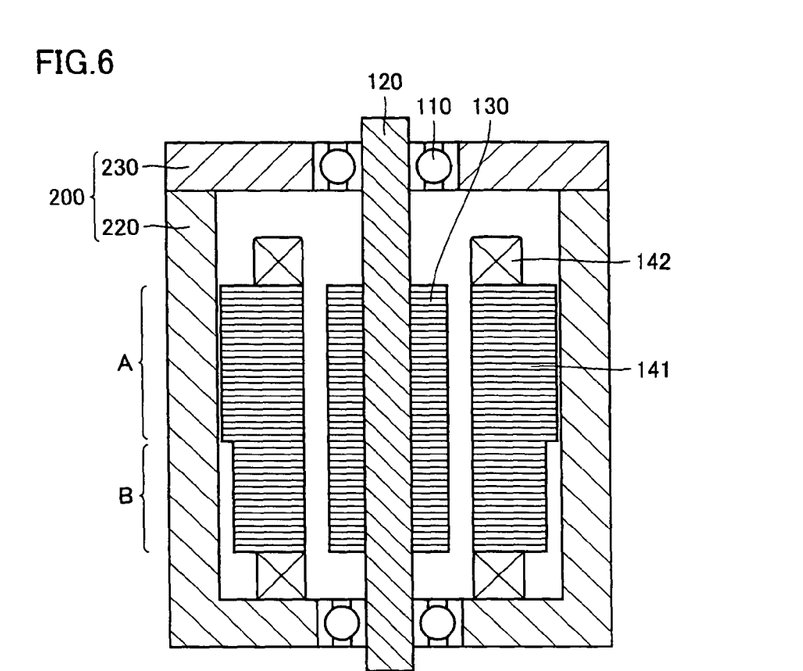
FIG. 6 is a cross section of a rotating electric machine including a further modification of the securing structure for the stator according to an embodiment of the present invention.
Figure 7:
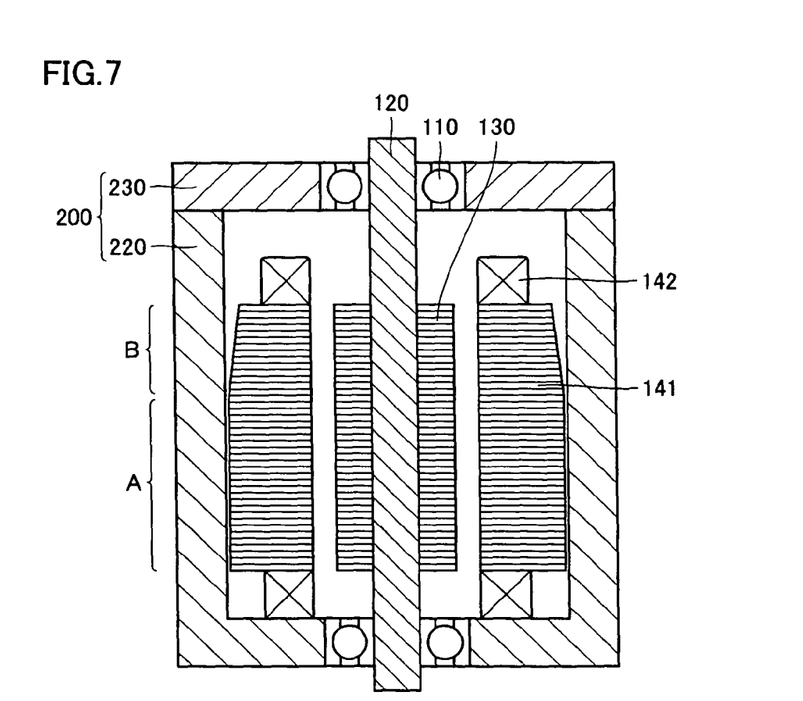
FIG. 7 is a cross section of a rotating electric machine including a further modification of the securing structure for the stator according to an embodiment of the present invention.

FIGS. 3 to 7 are each a diagram showing a modification of the securing structure for the stator shown in FIG. 2. Referring to FIG. 3, portion A where the clearance between the outer circumferential surface of stator core 141 and the inner circumferential surface of case 220 is relatively small may be provided on cover 230 side with respect to portion B where the clearance is relatively large. Further, referring to FIG. 4, portion A where the clearance is relatively small and portion B where the clearance is relatively large may be formed by providing a tapered portion where the inner diameter of case 220 becomes gradually larger, on the inner circumferential surface of case 220. Referring to FIGS. 5 to 7, portion A and portion B as described above may be provided by varying the outer diameter of stator core 141 in the axial direction of stator core 141. In this case as well, the outer circumferential surface of stator core 141 may have a stepped portion as shown in FIGS. 5 and 6, or a tapered portion where the outer diameter of stator core 141 gradually decreases may be formed on the outer circumferential surface of stator core 141 as shown in FIG. 7.

Figure 8:
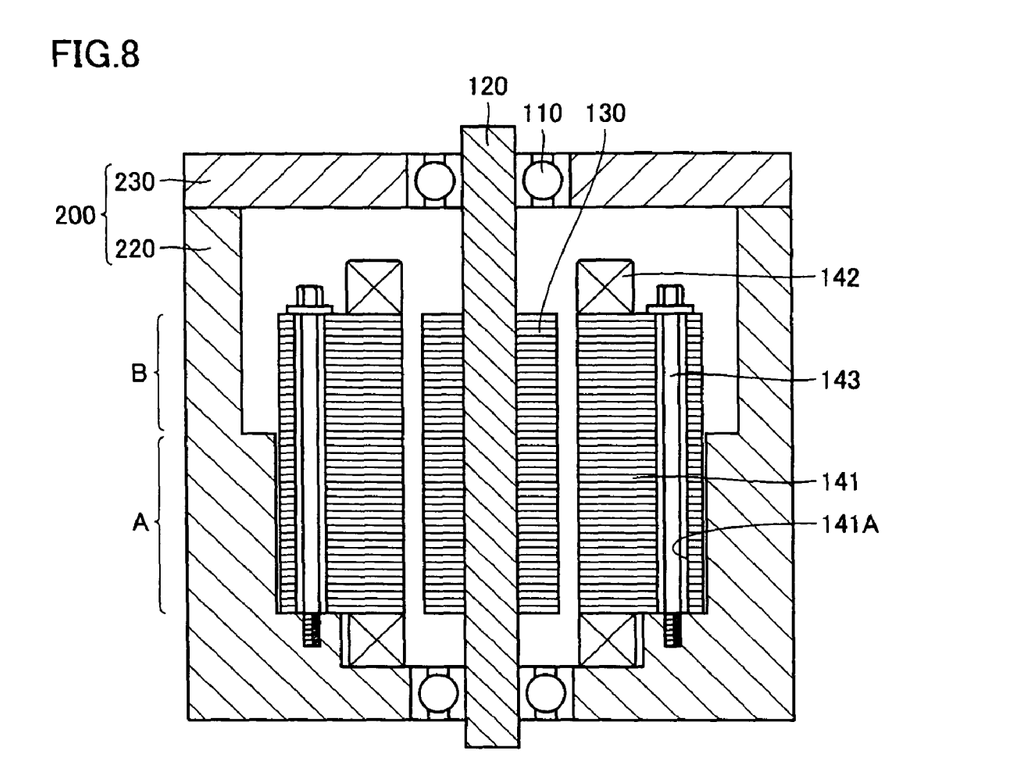
FIG. 8 is a (first) diagram illustrating a fastening member in a securing structure for a stator according to an embodiment of the present invention.
Figure 9:
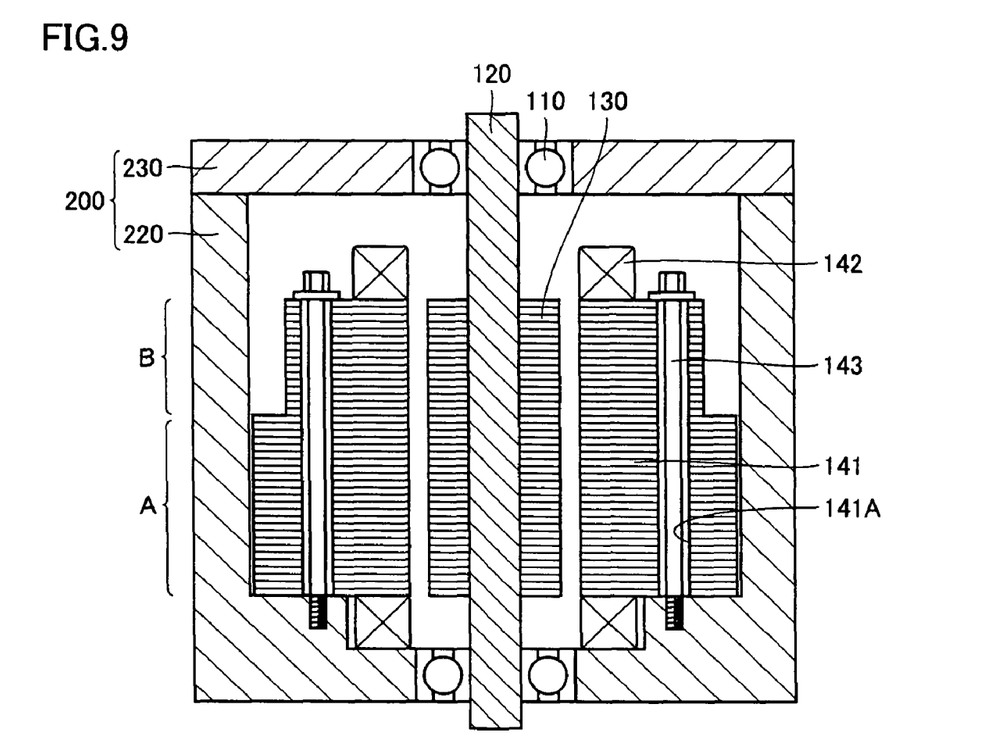
FIG. 9 is a (second) diagram illustrating a fastening member in a securing structure for a stator according to an embodiment of the present invention.

FIGS. 8 and 9 are each a diagram illustrating a fastening member in the securing structure for the stator according to the present embodiment. Referring to FIGS. 8 and 9, stator core 141 includes a hole 141A extending in the axial direction. A fastening member 143 is inserted into hole 141A. An end of fastening member 143 is screwed into and secured to case 220. Accordingly, the axial force of fastening member 143 is transmitted to stator core 141 and stator core 141 is secured to case 220. Here, the other end (the end on the bolt head side) of fastening member 143 is not supported by case 220. Namely, in the examples in FIGS. 8 and 9, fastening member 143 is supported in cantilever manner, namely supported at only one end by case 220. In the case of this cantilever structure, the side-to-side deviation of fastening member 143 tends to become larger on the side (namely the upper side in FIGS. 8 and 9) opposite to the side where fastening member 143 is secured to case 220, and consequently vibration of stator core 141 caused when motor generator 100 is driven is likely to become larger. In the examples in FIGS. 8 and 9, portion B where the clearance between the outer circumferential surface of stator core 141 and the inner circumferential surface of case 220 is relatively large is provided on cover 230 side (namely the upper side in FIGS. 8 and 9) with respect to portion A where the clearance is relatively smaller. More specifically, in the example in FIG. 8, the diameter of stator core 141 is substantially constant over the whole in the axial direction, while the inner diameter of case 220 is made smaller on the side closer to the end (secured portion) of fastening member 143. Further, in the example in FIG. 9, while the inner diameter of case 220 is substantially constant over the whole in the axial direction, the outer diameter of stator core 141 is made larger on the side closer to the end (secured portion) of fastening member 143. In this way, in the portion located on the upper side in FIGS. 8 and 9 (portion B), the clearance between the outer circumferential surface of stator core 141 and the inner circumferential surface of case 220 can be made relatively larger and, in the portion located on the lower side in FIGS. 8 and 9 (portion A), the clearance between the outer circumferential surface of stator core 141 and the inner circumferential surface of case 220 can be made relatively smaller.

The structures shown in FIGS. 8 and 9 can be used to suppress the contact between stator core 141 and case 220 in the region where vibration of stator core 141 is large, so that transmission of the vibration of stator core 141 to housing 200 can be more effectively suppressed. In the examples in FIGS. 8 and 9, a stepped portion is provided on the inner circumferential surface of case 220 or the outer circumferential surface of stator core 141 to vary the clearance between the outer circumferential surface of stator core 141 and the inner circumferential surface of case 220. Alternatively, the clearance between the outer circumferential surface of stator core 141 and the inner circumferential surface of case 220 may be varied by providing the tapered portion where the inner diameter of case 220 or the outer diameter of stator core 141 is gradually varied. Both of the above-described stepped portion and the tapered portion may be used to vary the clearance between the outer circumferential surface of stator core 141 and the inner circumferential surface of case 220.

In summary, the securing structure for the stator according to the present embodiment includes stator 140 having stator core 141 and housing 200 having an opening portion containing stator core 141, and housing 200 includes portion A corresponding to "first portion" where the clearance between the inner circumferential surface of the opening portion and stator core 141 is relatively smaller and the inner diameter of the opening portion is constant, and portion B corresponding to "second portion" adjacent to portion A in the axial direction of stator core 141 where the clearance between the inner circumferential surface of the opening portion and stator core 141 is relatively larger.

Here, in one aspect, respective clearances in portion A and portion B are made different from each other by varying the inner diameter of the opening portion of housing 200 along the axial direction of stator core 141 as shown in FIGS. 2 to 4.

Further, in another aspect, respective clearances in portion A and portion B are made different from each other by varying the outer diameter of stator core 141 along the axial direction of stator core 141 as shown in FIGS. 5 to 7.

In the securing structure for the stator as described above, the clearance between the inner circumferential surface of the opening portion and stator core 141 in portion B is determined such that portion B of housing 200 and stator core 141 is separated from each other even in the case where the angle of inclination ($\theta$) of stator core 141 is a maximum angle.

Moreover, the securing structure for the stator as described above further includes fastening member 143 inserted into stator core 141 in the axial direction of stator core 141 and having one end secured to housing 200 to fasten stator core 141 to housing 200. Portion A of housing 200 is located on the side where fastening member 143 is secured to housing 200 (namely the lower side in FIG. 8) relative to portion B.

The securing structure for the stator according to the present embodiment can be used to facilitate precise positioning of stator core 141, since the clearance between the inner circumferential surface of the opening portion and stator core 141 is smaller in portion A of housing 200. Further, since the clearance is larger in portion B of housing 200, contact between the inner circumferential surface of the opening portion and stator core 141 is suppressed, and the area of contact between hosing 200 and stator core 141 is reduced. Thus, transmission of vibration of stator core 141 to housing 200 can be suppressed. Consequently, the vibration and noise caused when motor generator 100 is driven are suppressed.

Further, since the area of contact between stator core 141 and housing 200 is small, even if the angle of inclination of stator core 141 is large, the influence of the deformation on housing 200 is small so that loss of the sealing ability of housing 200 can be suppressed.

It should be construed that embodiments disclosed above are by way of illustration in all respects, not by way of limitation. It is intended that the scope of the present invention is defined by claims, and includes all modifications and variations equivalent in meaning and scope to the claims.

INDUSTRIAL APPLICABILITY

The present invention is applicable for example to a securing structure for a stator and an electric vehicle.

The invention claimed is:

1. A securing structure for a stator, comprising:
   the stator including a stator core; and
   a housing having an opening portion containing said stator core,
   said housing including a first portion opposite to one end in an axial direction of said stator core, where an inner diameter of said opening portion is constant, and a second portion opposite to the other end in the axial direction of said stator core and formed apart from said stator core while being directly opposite to said stator core, and
   a clearance between an inner circumferential surface of said opening portion and said stator core in said second portion being set larger than a clearance between the inner circumferential surface of said opening portion and said stator core in said first portion.

2. The securing structure for the stator according to claim 1, wherein
   respective clearances in said first portion and said second portion, between the inner circumferential surface of said opening portion and said stator core are made different from each other by varying the inner diameter of said opening portion of said housing along the axial direction of said stator core.

3. The securing structure for the stator according to claim 1, wherein
   respective clearances in said first portion and said second portion, between the inner circumferential surface of said opening portion and said stator core are made different from each other by varying an outer diameter of said stator core along the axial direction of said stator core.

4. The securing structure for the stator according to claim 1, wherein
   said second portion as a depth of at most a half of a whole depth of said opening portion.

5. The securing structure for the stator according to claim 1, wherein
   the clearance between the inner circumferential surface of said opening portion and said stator core in said second portion is determined such that said second portion of said housing and said stator core are apart from each other even in a case where an angle of inclination of said stator core is a maximum angle.

6. The securing structure for the stator according to claim 1, further comprising a fastening member inserted into said stator core in the axial direction of said stator core, and having one end secured to said housing to fasten said stator core to said housing, wherein
   said first portion is located on a side where said fastening member is secured to said housing relative to said second portion.

7. The securing structure for the stator according to claim 1, wherein
   the securing structure for the stator is disposed within an electric vehicle.

8. The securing structure for the stator according to claim 1, wherein
   an outer diameter of said stator core is constant over a whole in the axial direction of said stator core, and a step is formed at an inner circumferential surface of said housing.

9. The securing structure for the stator according to claim 1, wherein
   said stator core is capable of being secured to said housing in a state where an axial center of said stator core is displaced from an axial core of a stator-containing portion of said housing.

10. The securing structure for the stator according to claim 1, wherein
   said stator core is formed by stacking sheet-shaped magnetic bodies,
   said stator core has a hole extending in the axial direction of said stator core, and said stator core is secured to said housing by securing to said housing an end portion of a fastening member inserted into said hole to extend from said second portion to said first portion, and said stator core is capable of being secured to said housing in a state where an axial center of said stator core is displaced from an axial core of a stator-containing portion of said housing.

11. The securing structure for the stator according to claim 1, wherein the clearance between the inner circumferential surface of said opening portion and said stator core in said second portion is set larger than the clearance between the inner circumferential surface of said opening portion and said stator core in said first portion by making larger the inner diameter of said opening portion in said second portion of said housing than the inner diameter of said opening portion in said first portion of said housing.

12. The securing structure for the stator according to claim 1, wherein the clearance is formed over a whole periphery between the inner circumferential surface of said opening portion and said stator core in said first portion of said housing.

13. A securing structure for a stator, comprising:

the stator including a stator core; and a housing having an opening portion containing said stator core, said housing including a first portion opposite to one end in an axial direction of said stator core, where an inner diameter of said opening portion is constant, and a second portion opposite to the other end in the axial direction of said stator core and formed apart from said stator core such that transmission of vibration from said stator core is suppressed, and a clearance between an inner circumferential surface of said opening portion and said stator core in said second portion being set larger than a clearance between the inner circumferential surface of said opening portion and said stator core in said first portion.

* * * * *